US012579299B2

(12) United States Patent
Labine et al.

(10) Patent No.: US 12,579,299 B2
(45) Date of Patent: Mar. 17, 2026

(54) USING VENDOR-INDEPENDENT PROTOCOLS TO PERFORM IDENTITY AND ACCESS MANAGEMENT FOR ELECTRONIC MEDICAL RECORD INSTANCES

(71) Applicant: Praia Health Inc., Renton, WA (US)

(72) Inventors: David J. Labine, Seattle, WA (US); Shivudu Bhuvanagiri, Seattle, WA (US)

(73) Assignee: Praia Health Inc., Renton, WA (US)

( * ) Notice: Subject to any disclaimer, the term of this patent is extended or adjusted under 35 U.S.C. 154(b) by 114 days.

(21) Appl. No.: 18/056,189

(22) Filed: Nov. 16, 2022

(65) Prior Publication Data

US 2024/0160776 A1     May 16, 2024

(51) Int. Cl.
G06F 21/62 (2013.01)
G06F 21/60 (2013.01)

(52) U.S. Cl.
CPC ........ G06F 21/6245 (2013.01); G06F 21/604 (2013.01); *G06F 2221/2141* (2013.01)

(58) Field of Classification Search
None
See application file for complete search history.

(56) References Cited

U.S. PATENT DOCUMENTS

| | | | |
|---|---|---|---|
| 7,039,656 | B1 | 5/2006 | Tsai et al. |
| 7,330,971 | B1 | 2/2008 | Kukreja et al. |
| 7,428,750 | B1 | 9/2008 | Dunn et al. |
| 8,201,217 | B1 | 6/2012 | Begen et al. |
| 10,353,581 | B1 | 7/2019 | Reicher et al. |
| 2004/0123151 | A1 | 6/2004 | Mizrah |
| 2007/0078685 | A1* | 4/2007 | Dettinger ............... G06Q 20/40 705/3 |
| 2008/0167892 | A1 | 7/2008 | Clark et al. |
| 2012/0291114 | A1 | 11/2012 | Poliashenko et al. |
| 2013/0166918 | A1 | 6/2013 | Shahbazi et al. |

(Continued)

FOREIGN PATENT DOCUMENTS

WO     WO-2021159167 A1 *     8/2021

OTHER PUBLICATIONS

U.S. Appl. No. 63/293,969, filed Dec. 27, 2021, Bhuvanagiri et al.

(Continued)

*Primary Examiner* — Benjamin E Lanier
*Assistant Examiner* — Felicia Farrow
(74) *Attorney, Agent, or Firm* — Seed Intellectual Property Law Group LLP

(57) ABSTRACT

A facility for providing access to an electronic medical record instance receives a login attempt from a client device that provides login credentials. The facility uses these login credentials to access an account key associated with the login credentials, and retrieves from a patient link database a mapping from the accessed account key to a mapped-to record identifier and a mapped-to instance identifier. The mapped-to record identifier identifies a patient record maintained on an electronic medical record instance identified by the mapped-to instance identifier. The facility uses the mapped-to record identifier and mapped-to instance identifier to provide the client device access to the patient record having the mapped-to record identifier on the instance identified by the mapped-to instance identifier.

20 Claims, 6 Drawing Sheets

(56)         References Cited

U.S. PATENT DOCUMENTS

| | | | |
|---|---|---|---|
| 2013/0197940 A1* | 8/2013 | Garber | G16H 10/60 |
| | | | 705/3 |
| 2014/0068255 A1 | 3/2014 | Park et al. | |
| 2015/0220746 A1 | 8/2015 | Li et al. | |
| 2015/0379203 A1 | 12/2015 | Douglass | |
| 2017/0124261 A1 | 5/2017 | Mari | |
| 2019/0206531 A1* | 7/2019 | Vandersluis | G16H 10/60 |
| 2022/0245270 A1* | 8/2022 | De Araujo | G16H 40/67 |
| 2023/0205862 A1 | 6/2023 | Bhuvanagiri et al. | |
| 2023/0385450 A1* | 11/2023 | Bessette | G16H 10/20 |

OTHER PUBLICATIONS

U.S. Appl. No. 17/589,084, filed Jan. 31, 2022, Bhuvanagiri et al.
Bhuvanagiri, et al., "Single Signon Across Multiple Application Instances, Such as Electronic Medical Record System Instances," U.S. Appl. No. 63/293,969, filed Dec. 27, 2021. (35 pages).
International Search Report and Written Opinion of the International Searching Authority, mailed Mar. 13, 2024, International Application No. PCT/US2023/079779, filed Nov. 15, 2023.
Soohoo et al., "Accessing Patient Electronic Health Record Safety Portals Safely Using Social Credentials: Demonstration Pilot Study", JMIR Formative Research, vol. 6, Issue 1, Jan. 27, 2022 (12 pages).

* cited by examiner patient link database ⌐ *500*

| IDP key | EHR instance | FHIR ID | |
|---|---|---|---|
| 34102129 | EP1 | 618273 | *501* |
| 58341892 | EP2 | 761932 | *502* |
| 73291283 | EP2 | 423678 | *503* |
| 91890154 | C1 | 678193 | *504* |
| 91890154 | EP1 | 193721 | *505* |
| *511* | *512* | *513* | |

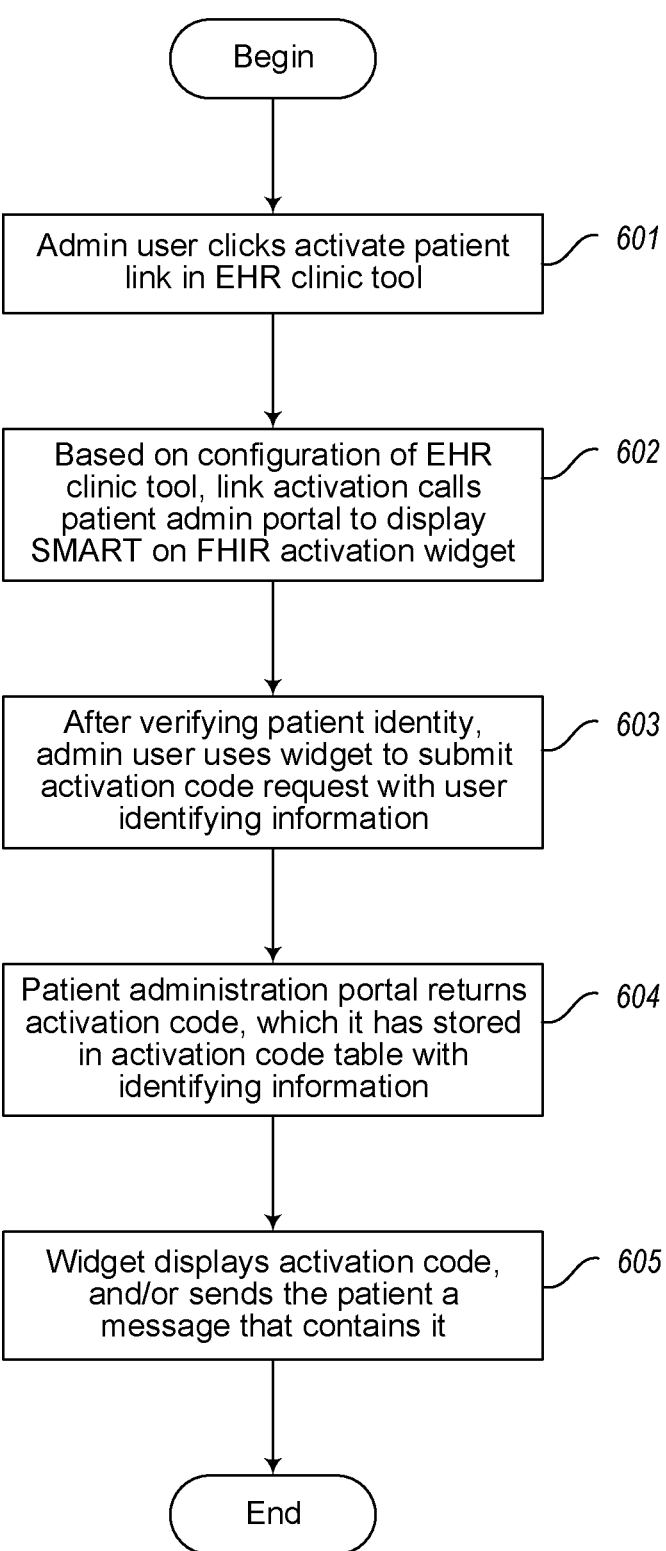

Begin

Admin user clicks activate patient link in EHR clinic tool — 601

Based on configuration of EHR clinic tool, link activation calls patient admin portal to display SMART on FHIR activation widget — 602

After verifying patient identity, admin user uses widget to submit activation code request with user identifying information — 603

Patient administration portal returns activation code, which it has stored in activation code table with identifying information — 604

Widget displays activation code, and/or sends the patient a message that contains it — 605

End

*FIG. 6*

USING VENDOR-INDEPENDENT PROTOCOLS TO PERFORM IDENTITY AND ACCESS MANAGEMENT FOR ELECTRONIC MEDICAL RECORD INSTANCES

CROSS-REFERENCE TO RELATED APPLICATIONS

This application is related to U.S. Provisional Patent Application No. 63/293,969, filed Dec. 27, 2021 and entitled "SINGLE SIGNON ACROSS MULTIPLE APPLICATION INSTANCES, SUCH AS ELECTRONIC MEDICAL RECORD SYSTEM INSTANCES;" and U.S. patent application Ser. No. 17/589,084, filed Jan. 31, 2022 and entitled "SINGLE SIGN-ON ACROSS MULTIPLE APPLICATION INSTANCES, SUCH AS ELECTRONIC MEDICAL RECORD SYSTEM INSTANCES," each of which is hereby incorporated by reference in its entirety.

In cases where the present application conflicts with a document incorporated by reference, the present application controls.

BACKGROUND

Electronic medical records systems ("EMRs," also referred to as electronic health record systems, "EHRs") store, display, and exchange information about patients. The information stored by an EMR about a particular patient is referred to as a record. It is common for EMRs to establish accounts for patients that they can use to view and interact with the information in their records via the web or a smartphone app.

As part of establishing an account for a patient, an EMR typically collects and stores the patient's email address—or a separate sign-in name—and a password. The EMR creates a mapping from the patient's sign-in name to an internal identifier used by EMR to access the patient's EMR record.

To access his or her record, a patient inputs his or her sign-in name and password into a web form or smartphone app, which forwards them to the EMR. The EMR authenticates the patient, uses the mapping to identify his or her record, and provides access to that record via the web browser or smartphone app.

BRIEF DESCRIPTION OF THE DRAWINGS

FIG. 6 is a flow diagram showing a process performed by the facility in some embodiments to provide administrative functionality for the health system accounts maintained for patients by the facility.

DETAILED DESCRIPTION

Figure 1:
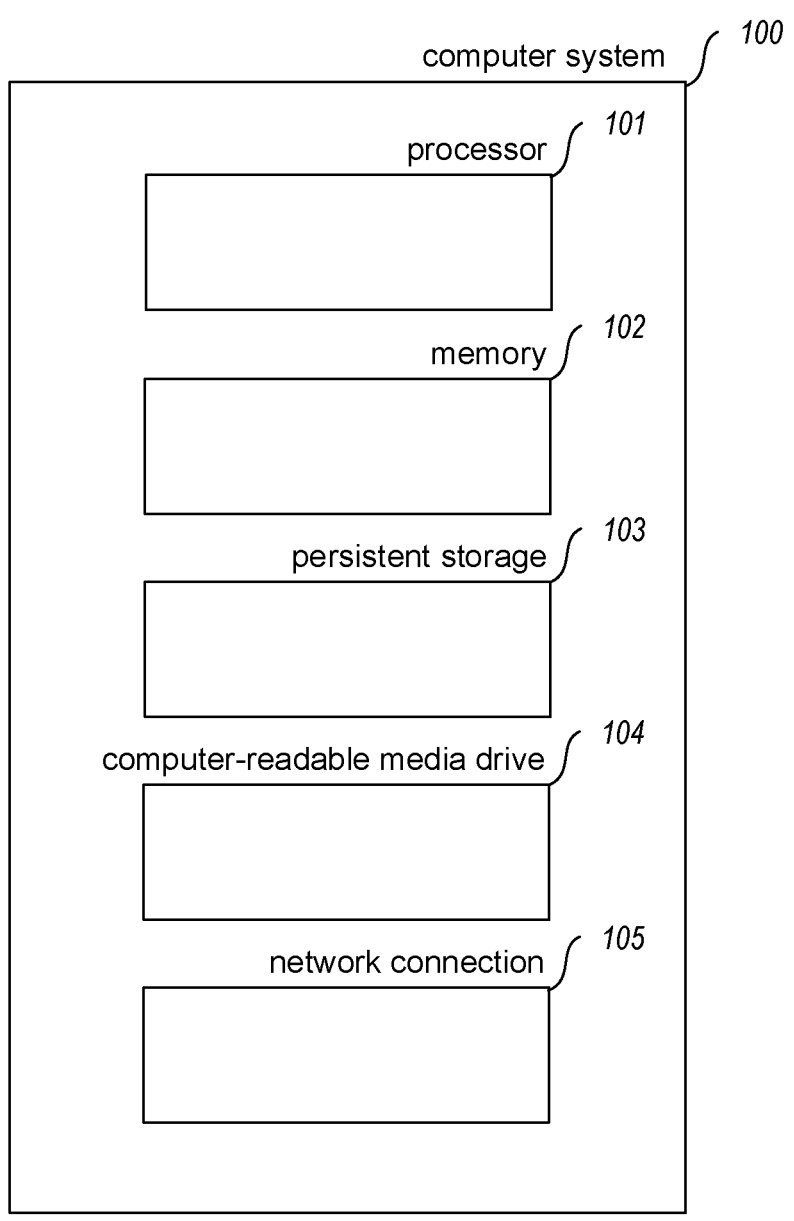
FIG. 1 is a block diagram showing some of the components typically incorporated in at least some of the computer systems and other devices on which the facility operates.

The inventors have recognized a number of disadvantages in the ways that patients conventionally access their EMR data. In some cases multiple EMR instances contain records for the same patient—such as when a health system maintains different EMR instances for different geographic regions, and the patient receives care in multiple of these regions. In such cases, the patient must typically establish a separate account on each of these EMR instances. In some cases, the patient must travel to a clinic for in-person identity verification before they are permitted to create an account. Each time they need information from an EMR instance, the patient must manually navigate to it and use the proper credentials to sign in. The sign-in user interface experience can vary by EMR vendor, or even between EMR instances from a single EMR vendor. Once signed in, the patient's user interface experience can vary dramatically from other EMR instances, particularly those from different EMR vendors. If a patient has a problem with their account for a particular EMR instance—such as losing its password—the patient must interact with a support person designated to help with accounts on that EMR instance. To provide the needed support, that support person must use an account administration user interface that varies by EMR provider.

Further, different portions of the data about such a patient are siloed in different EMR instances, and can't be accessed together by medical professionals. In order to extract data from a particular EMR instance for processing in a different EMR instance or separate application, a program must be coded to use APIs exposed by the source EMR instance that are proprietary to the EMR instance's vendor, and interpret, map, and/or transform the form in which those APIs return the data into a form that can be used for processing. In some cases, such programs must be specially approved by the EMR vendor in order to be permitted to call these proprietary APIs.

Also, a health system that wishes to market services to patients or prospective patients can connect those marketing efforts to patient EMR data only via patient identifiers that are internal to each EMR instance. This creates difficulty in tracking marketing efforts and their results with respect to patients whose data spans two or more different EMR instances.

In response recognizing these disadvantages, the inventors have conceived and reduced to practice a hardware and/or software facility for performing identity and access management ("IAM") for EMR instances using vendor-independent protocols ("VIPs") to interact with the electronic medical record instances ("the facility"). In some embodiments, the facility uses a Fast Health Interoperability Resources ("FHIR") vendor-independent protocol developed by the Health Level Seven International standards organization and described in HL7 FHIR available at www.hl7.org/fhir/, which is hereby incorporated by reference in its entirety. Many of the examples given herein of using vendor-independent protocols relate to the FHIR standard and its application programming interfaces ("APIs"). In various embodiments, the facility uses a variety of other vendor-independent protocols.

In some embodiments, the facility enables the patient to create a single account to use to access all of the EMR instances employed by a particular health system, which may encompass a large number of hospitals, surgical centers, clinics, fast-care centers, specialty practices, imaging facilities, testing laboratories, etc. In connection with account creation, the facility collects identifying information about the patient that it uses to connect the account to records maintained for the patient in one or more of the EMR instances. In various embodiments, the facility collects this patient identifying information via electronic interactions with the patient or in-person interactions between the patient and an account administration worker. In some embodiments, the facility transmits this patient identifying information to the health system's EMR instances in the invocation of a Search VIP API, and receives responses from each instance identifying any EMR record maintained by the EMR instance that matches the identifying information. In a patient link database, the facility stores a mapping from the patient's single account to these EMR record identifiers, each qualified by the corresponding EMR instance. If no EMR instance responds with a matching EMR record, the facility selects an EMR instance, and sends the patient identifying information in a Create VIP API invocation against the selected EMR instance. The EMR instance returns the record ID of the record it creates in response, which the facility stores in the patient link database for the single account.

The patient subsequently uses their account and the corresponding credentials—e.g., email address or other username and password—to sign in to the facility and access data in their EMR record(s). This is via a client program, which can be an installed special-purpose application, such as a smartphone app, or via a web browser. In some embodiments, in response to signing in to the account, the facility returns one or more of the EMR record IDs to which the account is mapped—such as in the form of an access token encoding the record ID—for the client to use to directly access the EMR record in the corresponding EMR instance. In some embodiments, after the account sign-in is complete, the facility responds to requests from the client to access data in the EMR record by (1) calling a Read VIP API with the mapped-to record ID to retrieve this data from the appropriate EMR instance(s), and (2) passing it back to the client. In some embodiments, the facility uses a similar process to enable the client to write to certain portions of the EMR record.

In some embodiments, the facility allows administrative workers to perform administrative actions with respect to a patient's single account using vendor-specific administrative EHR software tools. In particular, the facility causes these vendor-specific "clinic tools" to be configured to contain controls for accessing vendor-independent widgets provided by the facility for performing account administration tasks like patient activations and password resets. For sample, in some embodiments, the facility implements these widgets as SMART on FHIR widgets, described by Developer Resources, available at smarthealthit.org/developer-resources/, which is hereby incorporated by reference in its entirety. These widgets, implemented as part of the facility, permit administration of the facility's patient accounts in a consistent way across the different clinic tools implemented by different EHR vendors.

By performing in some or all of the ways described above, the facility enables a health system to provide a single, unified security and user interface experience to patients and administrative workers that spans different EHR instances used by the health system, even those that are of different types and are provided by different vendors.

Additionally, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with lesser latency, and/or preserving more of the conserved resources for use in performing other tasks. For example, by providing a single account through which to access data on multiple EHR instances, the facility reduces usage of hardware resources in several respects, including: eliminating processing resources used on both client device and EHR instance servers to login to each EHR instance account, and associated network traffic; using VIP APIs reduces the storage that would be needed on facility servers to store different code for accessing data in EHR instances from each EHR vendor, and obviates the use of processing resources on developer computer systems that would be consumed to develop this different code. Also, the facility enables EHR vendors to eliminate native patient accounts and their administration tools from their EHRs, reducing the complexity, storage, and processing demands of their EHRs.

FIG. 1 is a block diagram showing some of the components typically incorporated in at least some of the computer systems and other devices on which the facility operates. In various embodiments, these computer systems and other devices 100 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 101 for executing computer programs and/or training or applying machine learning models, such as a CPU, GPU, TPU, NNP, FPGA, or ASIC; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
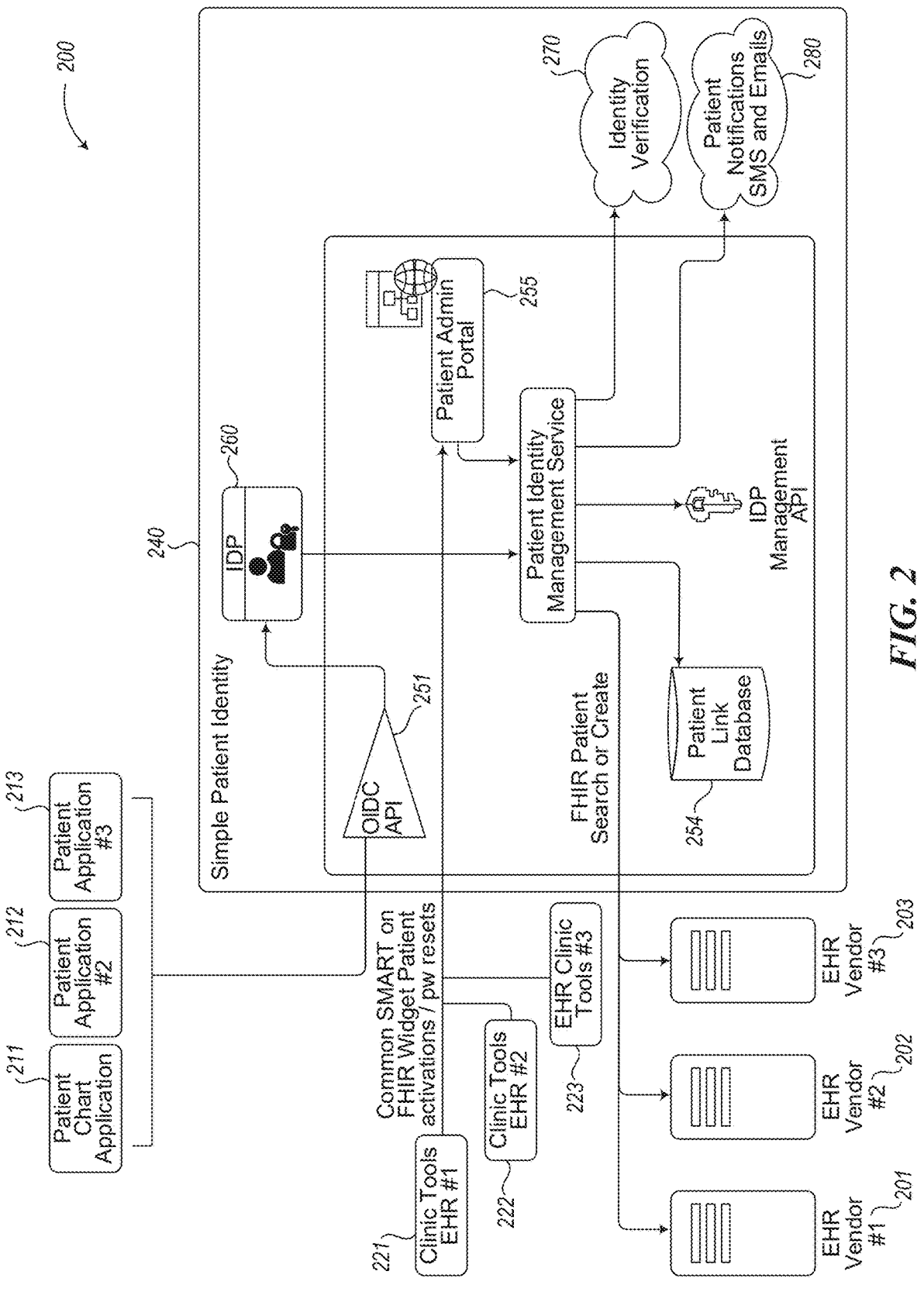
FIG. 2 is an invocation and data flow diagram showing operation of the facility in some embodiments.

FIG. 2 is an invocation and data flow diagram showing operation of the facility in some embodiments. In the diagram 200, a patient chart application 211 and two other example patient applications 212 and 213 access EHR instances 201-203 via a simple patient identity service 240 provided by the facility. In particular, each of the applications—which are sometimes referred to as clients herein and can variously be installed application as well as web applications executed on and/or displayed by web browsers—call an IDP service 260 via an Open ID Connect API 251. Initially, these calls to the IDP can be to establish a health system account on behalf of a patient. Identifying information for the patient is provided either directly by the patient through one of the clients or by an administrator using one of EHR clinic tools 221-223, interacting with a patient admin portal 255 provided by the facility. In addition to identifying information, the patient further provides identity verification information. Identity verification information that the patient provides directly is used by an identity verification service 270 to verify that the user has the identity indicated by the patient identifying information. As part of this process, the patient may provide points of contact such as a phone number for SMS messaging and an email address for emailing, which the facility verifies using a corresponding service 280. For identity verification information provided for the patient through an administrative worker and the clinic tools, either this same processing is performed by the facility to verify the patient's identity, or the administrative worker takes manual steps to verify identity such as reviewing and assessing photographic identity documents, such as driver's license, passport, other government ID, employer ID, etc. Upon establishing patient identity and identity verification, the facility calls an IDP management API in order to create an IDP key for use in identifying the patient. The facility seeks to associate the patient's IDP key in a patient link database with information used to identify the same patient by EHR instances that store EHR data on behalf of the patient. To this end, the facility uses a vendor-independent protocol such as FHIR to search on each of the EHR instances for the patient identifying information. The facility is able to formulate all of these search requests in the same way, even for EMR instances from different vendors. Each EHR instance responds with a patient identifier—such as a FHIR identifier—that it uses to identify this patient's record among its EHR records. For each EHR instance that returns such a record identifier, the facility creates a link from the patient's IDP key to that record identifier, qualified by the identity of the EHR instance that uses that record identifier. The facility stores this mapping in the patient link database 254. In cases where more than one EHR instance contains a record for the patient, the patient link database ends up having a mapping for each of these EHR instances from the patient's IDP key. If all of the EHR instances respond to the search call by indicating that they do not contain a record for this patient, the facility selects one of the EHR instances—such as based upon the geographic location of the patient—and uses a vendor-independent protocol API to call that EHR instance to create a record for the patient. The facility then populates a mapping from this new EHR record ID from the patient's IDP key into the patient database.

Subsequently, the clients can use the IDC API to log into the IDP with the patient account credentials, and subsequently obtain access to contents of the patient's EHR data stored in one or more EHR instances. In some embodiments, the client gains this access by receiving from the facility each EHR patient identifier linked to in the patient link database from the patient's IDP key, qualified by the EHR instance identity. In some cases, the facility also provides a token or other additional credentials that enable the client to use the record identifier and EHR instance identity to access contents of the patient's EHR record. In some embodiments, the facility provides contents of the patient's EHR records directly to the client, by requesting them from the EHR instance using a VIP API call that passes the patient's patient identifier, and returns this retrieved data to the client. In some embodiments, the facility formats some or all of this data for display by the client.

In some embodiments, the facility interacts with the EHR-specific clinic tools to provide a common interface to performing administrative functions with respect to the health system account that the facility creates and maintains on behalf of a patient. In particular, in some such embodiments, one or more of the clinic tools are configured to contain a link that calls the patient administrative portal to return a SMART on FHIR widget for performing administrative actions with respect to health system accounts, such as patient activations and password resets. While each of the clinic tools may be organized and operate differently, they end up showing a common user interface for performing administrative actions with respect to health system accounts.

Figure 3:
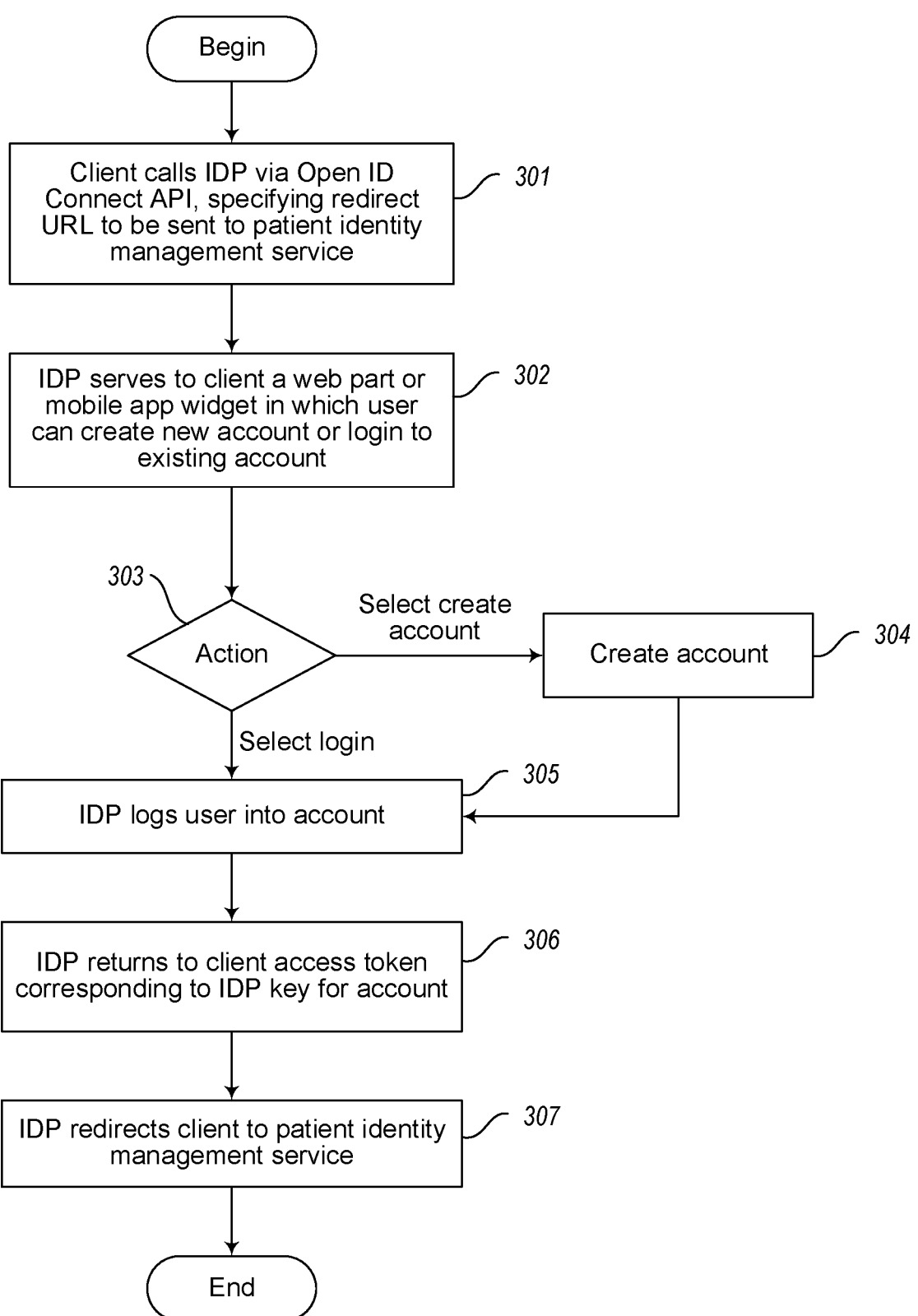
FIG. 3 is a flow diagram showing a process performed by the facility in some embodiments in order to log a patient into their health system account.

FIG. 3 is a flow diagram showing a process performed by the facility in some embodiments in order to log a patient into their health system account. In act 301, the client, such as clients 211-213, calls the IDP used by the facility using an open ID connect API, requesting sign-in and specifying a redirect URL to be provided to the facility's patient identity management service. In act 302, the IDP serves to the client a web part, mobile app widget, or other packaged user interface mechanism in which the user can create a new account or log into an existing account. In act 303, if the user's action is to select the create account option, then the facility continues in act 304, else the facility continues in act 305 where the user selects the login option. In act 304, the facility creates a health system account on behalf of the user, such as by collecting the user ID—such as email address—and password. Additionally, the facility may collect additional information about the user, such as the user's name, or other identifying or contact information for the user. After act 304, the facility continues in act 305. In act 305, the IDP logs the user into their health system account, by collecting login credentials such as user name and password and comparing them to login credentials stored by the IDP for the user. In act 306, the IDP returns to the client an access token corresponding to an IDP key that is associated with the account by the IDP. In act 307, the IDP redirects the client to the patient identity management service, which relies on the return client access token to perform further processing on behalf of the user. Some of this processing is described below in connection with FIG. 4. After act 307, this process concludes.

Those skilled in the art will appreciate that the acts shown in FIG. 3 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 4:
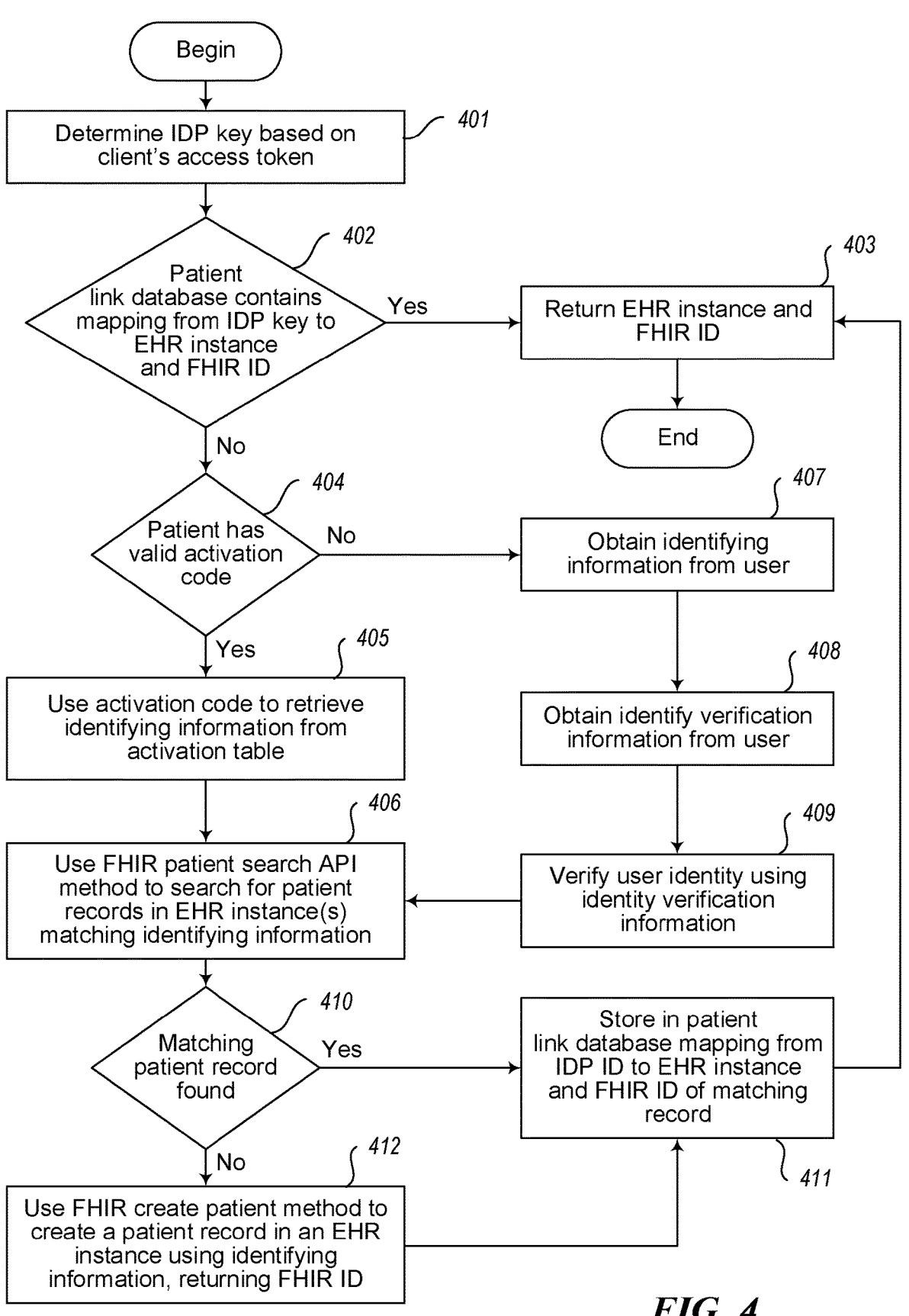
FIG. 4 is a flow diagram showing a process performed by the facility in some embodiments to perform processing on behalf of a patient in the patient identity management service.

FIG. 4 is a flow diagram showing a process performed by the facility in some embodiments to perform processing on behalf of a patient in the patient identity management service. In act 401, the facility in the patient identity management service determines the IDP key of the patient based upon the access token received and stored by the client. In act 402, if the patient link database contains one or more mappings from the IDP key determined in act 401 each to an EHR instance and FHIR ID—i.e., a patient or record ID used to identify the patient by the EHR instance—then the facility continues in act 403, else the facility continues in act 404. In act 403, the facility returns to the client the one or more pairs of EHR instance identifier plus FHIR ID for the patient to which the patient's IDP key is mapped by the patient link database. This, together with the access token, enables the client to directly access the patient's EHR records in the corresponding EHR instances. In some embodiments (not shown), in act 403, the facility additionally or instead uses one or more FHIR Read function API calls to the identified EHR instances—passing the corresponding FHIR ID—to read data from the mapped-to EHR records, and pass it to the client. After act 403, this process concludes.

In act 404, where the patient link database does not contain any mappings from a patient's IDP key, if the patient has a valid activation code, then the facility continues in act 405, else the facility continues in act 407. In act 405, the facility uses the activation code to retrieve identifying information from an activation table where it was stored at the time the activation code was issued, such as by an administrative user using the facility's account administration widget via one of the clinic tools. In some embodiments in which the facility has already located one or more client records in the EHR instances for the patient as part of the process of creating the patient's activation code and stored their FHIR IDs in the activation table, rather than proceeding from act 405 to act 406 to search for these EHR records as shown, the facility the facility proceeds directly to act 411.

In act 406, in embodiments in which the patient's EHR records were not identified during the process of creating the patient's activation code, the facility uses the FHIR patient search API method to search for patient records in EHR instances matching the identifying information retrieved from the activation table. In act 410, if one or more matching patient records are found, then the facility continues in act 411, else the facility continues in act 412. In act 411, the facility stores a mapping from the patient's IDP ID to the EHR instance and FHIR ID of each of the matching records. After act 411, the facility continues in act 403. In act 412, the facility uses a FHIR Create Patient method to create a patient record in one of the EHR instances using the patient's identifying information. This API call returns the FHIR ID of the created record. After act 412, the facility continues in act 411 to store mapping in the patient link database continuing the FHIR ID for the created record.

In act 407, where the patient does not have a valid activation code, the facility obtains identifying information from the user. This identifying information may include such attributes as legal name, social security number, driver's license number, postal address, contact information such as phone number, email address, fax number, etc. In act 408, the facility obtains identity verification information from the user. In various embodiments, this identity verification information includes information that is most available or exclusively available to the user and can include photographs of government-issued identification documents, for example. In act 409, the facility uses the identity verification information obtained in act 408 to verify the user identity corresponding to the user identifying information obtained in act 407, such as by calling an external identity verification service. After act 409, the facility continues in act 406.

Figure 5:
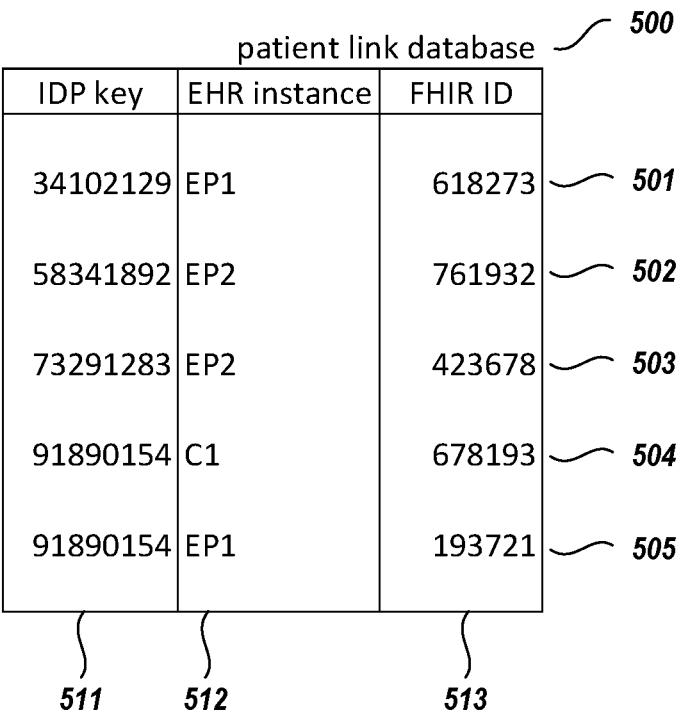
FIG. 5 is a table diagram showing sample contents of a patient linked database used by the facility in some embodiments to store mappings from IDP keys each representing a patient's single health system account to one or more pairs of an EHR instance and a record ID used by the EHR instance to identify the patient and the EHR record containing the data.

FIG. 5 is a table diagram showing sample contents of a patient linked database used by the facility in some embodiments to store mappings from IDP keys each representing a patient's single health system account to one or more pairs of an EHR instance and a record ID used by the EHR instance to identify the patient and the EHR record containing the data. The patient link database 500 is made up of rows such as rows 501-505 each corresponding to one such mapping. Each row is divided into the following columns: an IDP column 511 containing IDP key used by the IDP to identify the patient; an EHR instance column 512 containing an identifier for the EHR instance that contains a record for this patient; and a FHIR ID column 513 containing a FHIR ID—or a record ID or patient ID of another type—that identifies the patient and their EHR record within the EHR instance. For example, row 501 indicates that the patient having IDP key 34102129 has an EHR record on the EHR instance EP1 whose FHIR ID is 618273. In some cases, the EHR instance ID is organized in a way that identifies the vendor that provided the EHR instance. For example, the EHR instance IDs EP1 and EP2 contained by rows 501, 502, 503, and 505 may correspond to the Epic EHR vendor, while the EHR instance ID C1 in row 504 may correspond to the Cerner EHR vendor. In some cases, such as IDP key 91890154 appearing in both rows 504 and 505, the same IDP key is mapped to multiple EHR records, each in a different EHR instance. In such cases, the facility enables the patient to access data stored for the patient in each of these EHR instances.

While FIG. 5 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed, encrypted, and/or indexed; may contain a much larger number of rows than shown, etc.

FIG. 6 is a flow diagram showing a process performed by the facility in some embodiments to provide administrative functionality for the health system accounts maintained for patients by the facility. In particular, FIG. 6 shows provision of a new patient activation administrative functionality; the facility performs other administrative functionalities, such as password resets, in a similar manner. In act 601, an administrative user clicks an activate patient link in an EHR clinic tool that has been configured to display this link. In act 602, based upon this configuration of the EHR clinic tool, the link activation of act 601 calls the patient administrative portal to retrieve a smart on FHIR activation widget for display within, alongside, or in place of the clinic tool's visual display. In act 603, after the administrative user verifies patient identity—such as by reviewing the patient's government identity documents, the administrative user uses the widget retrieved in act 602 to submit an activation code request containing user identifying information that the administrative user obtained from the patient. In act 604, the patient administrative portal returns an activation code, which it has stored in an activation code table with the identifying information provided through the widget. In act 605, the widget displays the activation code, and/or sends the patient a message that contains the activation code, so that the patient can use the activation code in activation of a patient's health system account. After act 605, this process concludes.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a computing system for providing access to an electronic medical record instance, the method comprising:

receiving information identifying a person and login credentials;

in response to receiving the information:

based on receiving the information through a client:

causing, using an identity provider (IDP) service, a patient IDP key for a patient link database to be created for the person and associated login credentials;

for each of a plurality of electronic medical record (EMR) instances operated by a health system:

calling the EMR instance via a first vendor-independent protocol function, passing the received identifying information, to search the EMR instance for a patient record matching the received identifying information;

receiving a response to the call;

where the response contains a record identifier, storing in a patient link database that contains mappings from patient IDP keys to mapped-to record identifiers and mapped-to instance identifiers that identify the EMR instances storing patient records having the mapped-to record identifiers and that are organized in the patient link database to indicate vendors that provide the EMR instances for a plurality of patients, a mapping from the patient IDP key to the contained record identifier, together with an identifier of the EMR instance;

where, for each response, the response does not include a record identifier:

selecting two or more instances among the plurality of EMR instances;

calling the two or more selected EMR instances via one or more second vendor-independent protocol functions, passing the received identifying information, to create in the selected EMR instance a patient record for the person;

receiving responses to each of the calls containing a record identifier for the created patient record;

storing in the patient link database, for each of the two or more selected EMR instances, a mapping from the patient IDP key to the contained record identifier for the created patient record, together with an identifier of the selected EMR instance;

receiving a login attempt from a client device providing the login credentials;

using the login credentials provided in the login attempt to access the patient IDP key using the IDP service;

retrieving a mapping stored in the patient link database from the accessed patient IDP key to a mapped-to record identifier and a mapped-to instance identifier of the two or more selected EMR instances; and using the mapped-to record identifier and mapped-to instance identifier to provide the client device access to the patient record having the mapped-to record identifier on the EMR instance identified by the mapped-to instance identifier; and based on receiving the information through a clinic tool:

providing the client device access to a vendor-specific administrative tool that corresponds to the vendor and is usable to perform account administrative actions for a patient account corresponding to the login credentials.

2. The method of claim 1 wherein the vendor-independent protocol functions are protocol functions specified by the Fast Health Interoperability Resources protocol.

3. The method of claim 1 wherein providing the client device access to the patient record comprises transmitting to the client device a representation of the mapped-to record identifier and mapped-to instance identifier.

4. The method of claim 3, further comprising transmitting to the client device a token connoting authority for the client device to use the representation of the mapped-to record identifier and mapped-to instance identifier to access the patient record having the mapped-to record identifier on the EMR instance identified by the mapped-to instance identifier.

5. The method of claim 1 wherein providing the client device access to the patient record comprises:

calling the EMR instance identified by the mapped-to instance identifier via a third vendor-independent protocol function, passing the mapped-to record identifier, to retrieve contents of the patient record;

receiving a response containing contents retrieved from the patient records; and transmitting to the client device a representation of at least a portion of the contents contained by the response.

6. The method of claim 5, further comprising:

receiving patient data from the client device; and in response to receiving the patient data from the client device, calling the EMR instance identified by the mapped-to instance identifier via a fourth vendor-independent protocol function, passing the mapped-to record identifier and a representation of at least a portion of the received patient data, to cause the representation of the at least a portion of the received patient data to be added to the patient record having the mapped-to record identifier on the EMR instance identified by the mapped-to instance identifier.

7. The method of claim 5, further comprising:

generating a displayable version of at least a portion of the contents contained by the response, and where the transmitted representation is the generated displayable version.

8. One or more instances of computer-readable media not constituting signals per se, having contents configured to cause a computing system to perform a method for providing access to an electronic medical record instance, the method comprising:

receiving a login attempt from a client device providing login credentials;

based on receiving the login attempt through a client:

using the login credentials provided in the login attempt to obtain a patient identity provider (IDP) key for a patient link database from an identity provider (IDP) service, wherein the patient IDP key is associated with the login credentials;

using the patient IDP key, retrieving from the patient link database that contains mappings from patient IDP keys to mapped-to record identifiers and mapped-to instance identifiers for a plurality of patients, a mapping from the accessed patient IDP key to a mapped-to record identifier and a mapped-to instance identifier that identifies the electronic medical record (EMR) instance storing a patient record having the mapped-to record identifier and that is organized in the patient link database to indicate a vendor that provides the EMR instance, the mapped-to record identifier identifying the patient record maintained on the EMR instance identified by the mapped-to instance identifier, wherein the accessed patient IDP key is mapped to a plurality of instance identifiers and a corresponding plurality of record identifiers; and using the mapped-to record identifier and mapped-to instance identifier to provide the client device access to the patient record having the mapped-to record identifier on the EMR instance identified by the mapped-to instance identifier; and based on receiving the login attempt through a clinic tool:

providing the client device access to a vendor-specific administrative tool that corresponds to the vendor and is usable to perform account administrative actions for a patient account corresponding to the login credentials.

9. The one or more instances of computer-readable media of claim 8 wherein providing the client device access to the patient record comprises transmitting to the client device a representation of the mapped-to record identifier and mapped-to instance identifier.

10. The one or more instances of computer-readable media of claim 9, the method further comprising transmitting to the client device a token connoting authority for the client to use the representation of the mapped-to record identifier and mapped-to instance identifier to access the patient record having the mapped-to record identifier on the EMR instance identified by the mapped-to instance identifier.

11. The one or more instances of computer-readable media of claim 8 wherein providing the client device access to the patient record comprises:

calling the EMR instance identified by the mapped-to instance identifier via a first vendor-independent protocol function, passing the mapped-to record identifier, to retrieve contents of the patient record;

receiving a response containing contents retrieved from the patient records; and transmitting to the client device a representation of at least a portion of the contents contained by the response.

12. The one or more instances of computer-readable media of claim 11, the method further comprising:

receiving patient data from the client device; and in response to receiving the patient data from the client device, calling the EMR instance identified by the mapped-to instance identifier via a second vendor-independent protocol function, passing the mapped-to record identifier and a representation of at least a portion of the received patient data, to cause the representation of the at least a portion of the received patient data to be added to the patient record having the mapped-to record identifier on the EMR instance identified by the mapped-to instance identifier.

13. The one or more instances of computer-readable media of claim 11, the method further comprising:

generating a displayable version of at least a portion of the contents contained by the response, and where the transmitted representation is the generated displayable version.

14. One or more instances of computer-readable media not constituting signals per se, collectively storing a data structure, the data structure comprising a plurality of entries, each entry comprising:

a patient identity provider (IDP) key assigned to a patient and used by an IDP service to identify the patient;

first information identifying an electronic medical record (EMR) instance that maintains a patient record for the patient, wherein the first information is organized to indicate a vendor that provides the EMR instance; and second information identifying the patient record that the EMR instance identified by the first information maintains for the patient, such that the data structure is usable, in response to verifying patient login credentials with the IDP service, to transform a patient IDP key assigned to a logged-in patient into a plurality of EMR instance/patient record pairs usable to retrieve patient data for the logged-in patient.

15. The one or more instances of computer-readable media of claim 14 wherein the second information is a FHIR ID assigned to the patient by the electronic medical record instance identified by the first information, and wherein the data structure is usable to retrieve patient data for the logged-in patient by calling a FHIR Read function against the electronic medical record instance identified by the first information, passing the second information.

16. A method in a computing system for providing access to an electronic medical record (EMR) instance, the method comprising:

receiving a login attempt from a client device providing login credentials;

based on receiving the login attempt through a client:

using the login credentials provided in the login attempt to obtain a patient identity provider (IDP) key for a patient link database from an IDP service, wherein the patient IDP key is associated with the login credentials;

retrieving from the patient link database that contains mappings from patient IDP keys to mapped-to record identifiers and mapped-to instance identifiers that correspond to vendors that provide the EMR instance for a plurality of patients, a mapping from the accessed patient IDP key to a mapped-to record identifier and a mapped-to instance identifier that identifies the electronic medical record (EMR) instance storing a patient record having the mapped-to record identifier and that is organized in the patient link database to indicate a vendor that provides the EMR instance, the mapped-to record identifier identifying the patient record maintained on an EMR instance identified by the mapped-to instance identifier, wherein the accessed patient IDP key is mapped to a plurality of instance identifiers and a corresponding plurality of record identifiers; and using the mapped-to record identifier and mapped-to instance identifier to provide the client device access to the patient record having the mapped-to record identifier on the EMR instance identified by the mapped-to instance identifier; and based on receiving the login attempt through a clinic tool:

providing the client device access to a vendor-specific administrative tool that corresponds to the vendor and is usable to perform account administrative actions for a patient account corresponding to the login credentials.

17. The method of claim 16 wherein providing the client device access to the patient record comprises transmitting to the client device a representation of the mapped-to record identifier and mapped-to instance identifier.

18. The method of claim 17, the method further comprising transmitting to the client device a token connoting authority for the client to use the representation of the mapped-to record identifier and mapped-to instance identifier to access the patient record having the mapped-to record identifier on the EMR instance identified by the mapped-to instance identifier.

19. The method of claim 16 wherein providing the client device access to the patient record comprises:

calling the EMR instance identified by the mapped-to instance identifier via a first vendor-independent protocol function, passing the mapped-to record identifier, to retrieve contents of the patient record;

receiving a response containing contents retrieved from the patient records; and transmitting to the client device a representation of at least a portion of the contents contained by the response.

20. The method of claim 19, the method further comprising:

receiving patient data from the client device; and in response to receiving the patient data from the client device, calling the EMR instance identified by the mapped-to instance identifier via a second vendor-independent protocol function, passing the mapped-to record identifier and a representation of at least a portion of the received patient data, to cause the representation of the at least a portion of the received patient data to be added to the patient record having the mapped-to record identifier on the EMR instance identified by the mapped-to instance identifier.

\* \* \* \* \*